Patented July 16, 1935

2,008,327

UNITED STATES PATENT OFFICE 2,008,327

FILTERING COMPOSITION AND METHOD OF MAKING THE SAME

William C. Kuppinger, East Rochester, N. Y., assignor to Filtros Incorporated, Rochester, N. Y., a corporation of New York No Drawing. Application May 19, 1931
Serial No. 538,627

3 Claims. (Cl. 49—79)

My present invention relates to the manufacture of porous mineral products of the general nature described in the prior patents to James E. Porter, No. 1,117,601, dated November 17, 1914, and No. 1,118,441, dated November 24, 1914, and available for the same uses set forth therein, and the invention has for its object to improve both the process and resulting article so as to produce a more durable product of exact form and dimensions and possessing greater uniformity in the matter of porosity throughout the mass, as well as closely regulating such porosity.

To these and other ends, the invention resides in certain improvements and combinations of parts, all as will be hereinafter more fully described, the novel features being pointed out in the claims at the end of the specification.

As explained in the patents referred to, the product is more commonly formed in bricks or slabs and employed as a filtering medium for solutions and liquids of all kinds, particularly where a high resistance to the effects of acids and chemicals is required. With respect to these purposes, it may also take the form of tubes and pipes according to the processes in which its use is involved.

With my present improvements, the main constituents remain, as before, silicate particles, such as sand mixed and fused with powdered glass as binder, both of these substances being practically chemically inert. I have discovered, however, that the nature of the sand particles makes a great difference in the matter of uniformity in porosity in the product. The object being, in general, to hold the particles firmly bound together by the glass and yet create interstices providing the fine pores or tortuous passages that cause filtration, the use of ordinary sand, such as sharp building sand or other prismatic silicate particles, results in the fused glass collecting in solid masses in the angles of adjoining particles, limiting or destroying the porosity at localized points or regions and also causing it to bubble out at the surface, with consequent pitting. I have also discovered that very little moisture must remain in the moulded mixture or else fissures and cracks will appear in the article during the burning and become permanent thereafter. As a result of these and other discoveries, which will be duly pointed out, and after a great deal of experience in the field starting with the teachings of the Porter patents, aforesaid, I now proceed substantially as follows in the manufacture of an improved filtering medium highly superior with respect to the characteristics before mentioned.

I select a sand, the particles of which are globular instead of prismatic, so that the mutual contact of adjoining particles is truely tangential. With about eighty percent of this sand, I drymix approximately twenty percent of finely powdered glass, such as ordinary waste window glass, by agitation and churning. At first it was believed that the porosity could be best varied and controlled by adding more or less of the glass for the different densities. I have found that this control can best be effected by grading the sand to obtain a more uniform plate of various density rather than increasing or decreasing the glass component. In any event, careful sifting and grading is important. When thoroughly mixed (the glass itself being preferably of a fineness produced by sifting through a hundred mesh screen), a small amount of silicate of soda at about 60 Baumé containing a minimum of water (about ten percent) is added. This relatively wet composition is again thoroughly mixed, agitated and screened. The screening is important in order to prevent the glass powder from collecting in little balls or lumps that would also result in impervious spottings and the formation of cracks, fissures and pits.

The composition is now ready for the press, in which it is molded to its desired shape under a high but constant pressure of, say, ten tons. The molded form may now be removed with ordinary care, and my next step is to place it on a rack for air-drying at normal temperatures. This preliminary drying should last thirty-six to forty-eight hours, a time sufficient to allow the silicate of soda to set and the water to escape, so that a considerably less frangible form results that can be safely handled in the ensuing process of firing or burning, as it is called.

For this operation, the forms are packed in sand of the same nature as that entering into their composition and are placed in saggers or containers lined with the finished product that the process is designed to produce. I have found that fire brick and other such linings have a particular affinity to the fused glass which will escape and adhere to them, whereas with the arrangements just described, the glass component remains intact and is not disturbed. The control of the heat in firing is very important, the heat being recorded upon delicate instruments and carefully watched. While the silicate itself is so heat-resisting that overburning thereof is not probable the object is to be careful with the action of the glass so that it will be uniformly fused throughout the mass forming a thin film on each globular particle just sufficient to cause it to adhere lightly but strongly to adjacent particles and no more. It must not be allowed to collect to itself.

The temperature in the kiln is preferably about 2000 degrees Fahrenheit. In present manufacture, after the air-drying before mentioned, it takes about three days to load the kiln, which is then maintained at the temperature stated for six days during burning. Thereafter, the temperature is reduced during a period of eight days, which results in an annealing action that is very important. It takes three days more to unload the kiln. When the forms are taken therefrom, they are warped to a certain degree, are somewhat expanded over their original size as molded, and there is a skim or film upon their surfaces. This skim of exuded glass and other matter is impervious in spots and generally of less porosity than the interior. I remove this, therefore, by grinding with a carborundum or emery wheel which also reduces the form to definite size. Aside from testing for porosity under air pressure, the product is now complete. By regulating the coarseness of the silicate particles, filtering mediums transmitting from one to seventy-six plus cubic feet of air per minute can be produced.

Aside from the filtering function and the other uses for the product recited in the prior patents first above referred to, the refined product produced by my present method is and can be employed in general for aerating, diffusing, agitating and mixing both liquids and gases of every nature practically without regard to their chemical natures and activities.

I claim as my invention:

1. A filtering medium consisting of a relatively fine grained stone-like body composed of a quantity of silica in the form of globular sand particles and a relatively smaller quantity of powdered glass mixed therewith and fused in the mixture to form a unitary mass in which the glass binds the globular particles of sand tangentially by constituting films thereon adhering substantially only at such points of contact.

2. A process of producing a filtering medium which embodies mixing silica particles with a relatively smaller amount of powdered glass, forming the mass thus produced to a desired shape, imbedding the shape in a mass of like silica particles and isolated from any material having greater affinity for the glass binder than the instant product, and heating the shape so imbedded to fuse the glass and form a unitary structure.

3. A process of producing a filtering medium which embodies mixing silica particles with a relatively smaller amount of powdered glass, forming the mass thus produced to a desired shape, imbedding the shape in a mass of like silica particles in a sagger lined with a silicate structure to isolate it from any material having greater affinity for the glass binder than the instant product, and heating the shape so embedded to fuse the glass and form a unitary structure.

WILLIAM C. KUPPINGER.